(12) United States Patent
Tachiiri et al.

(10) Patent No.: US 7,445,092 B2
(45) Date of Patent: Nov. 4, 2008

(54) ELECTRIC PARKING BRAKE DEVICE

(75) Inventors: Yoshikazu Tachiiri, Chiryu (JP);
Takahiro Shiraki, Toyota (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 0 days.

(21) Appl. No.: 11/518,911

(22) Filed: Sep. 12, 2006

(65) Prior Publication Data
US 2007/0089940 A1    Apr. 26, 2007

(30) Foreign Application Priority Data
Oct. 17, 2005    (JP)    ............................. 2005-302053

(51) Int. Cl.
*F16D 65/14*    (2006.01)
(52) U.S. Cl. .................... 188/2 D; 188/204 R
(58) Field of Classification Search ................. 188/2 D, 188/79.55, 204 R; 303/20
See application file for complete search history.

(56) References Cited

U.S. PATENT DOCUMENTS

| 3,942,609 | A | * | 3/1976 | Hill | 188/24.16 |
| 4,448,436 | A | * | 5/1984 | Ohzono | 280/282 |
| 4,480,720 | A | * | 11/1984 | Shimano | 188/24.15 |
| 5,219,044 | A | * | 6/1993 | Siring | 188/2 D |
| 5,829,314 | A | * | 11/1998 | Scura | 74/502.4 |
| 6,305,238 | B1 | * | 10/2001 | Gabas | 74/502.6 |
| 6,662,909 | B2 | * | 12/2003 | Taniguchi | 188/162 |
| 6,820,516 | B2 | * | 11/2004 | Grundke | 74/501.5 R |

FOREIGN PATENT DOCUMENTS

| JP | 2001-173692 | | 6/2001 |
| JP | 2004-161101 | * | 6/2004 |
| JP | 2005-016600 | | 1/2005 |

* cited by examiner

*Primary Examiner*—Robert A. Siconolfi
*Assistant Examiner*—Vu Q Nguyen
(74) *Attorney, Agent, or Firm*—Buchanan Ingersoll & Rooney PC

(57) ABSTRACT

In an electric parking brake device, an equalizer is pivotably carried at its center part on a nut which is caused by an electric motor to perform linear reciprocating motion, and parking brakes are operated by respective cables which are connected respectively to the opposite end portions of the equalizer. Stop members are provided for preventing the pivot movement of the equalizer in the state that the equalizer is held returned by the operation of the electric motor to an extreme position on the side of the parking brakes. The stop members may be composed of a first stop member for preventing the equalizer from being pivoted in one direction and a second stop member for preventing the equalizer from being pivoted in the other direction, or may be constituted by a member of one piece structure for preventing the equalizer from being pivoted in both directions.

8 Claims, 3 Drawing Sheets

ELECTRIC PARKING BRAKE DEVICE

INCORPORATION BY REFERENCE

This application is based on and claims priority under 35 U.S.C. 119 with respect to Japanese Application No. 2005-302053 filed on Oct. 17, 2005, the entire content of which is incorporated herein by reference.

BACKGROUND OF THE INVENTION

1. Field of the Invention

The present invention relates to an electric parking brake device using an electric motor as power source and capable of bringing parking brakes into a braking state by the rotation of the electric motor in a positive-going direction but into a braking release state by the rotation of the electric motor in a negative-going direction.

2. Discussion of the Related Art

As electric parking brake devices of this kind, there has been known one which is described in Japanese unexamined, published patent application No. 2005-16600. The device is of the type that the reversible rotational motion of an electric motor is converted by a conversion mechanism into a reciprocating linear motion and that respective parking brakes are operated by a pair of cables whose respective one ends are connected to opposite end portions of an equalizer which is pivotably carried at its center part on a nut serving as an output section of the conversion mechanism. In the electric parking brake device of this type, the respective parking brakes can be operated by the same power at all times by the action of the equalizer whose center part is pivotably carried on the nut.

Further, as parking brakes for use together with the electric parking brake device, there has been known a technology which is disclosed in Japanese unexamined, published patent application No. 2001-173692. The parking brakes B disclosed there are of the type that a drum brake for each parking brake is incorporated inside a disc brake, and as shown in FIGS. 5 and 6, is provided with a first toggle link 36 and a second toggle link 37 which are coupled to be pivotable relative to each other by means of a connection pin 38 extending in parallel to a backing plate 30. A cable 20 (or 25) is inserted into each parking brake B from a cable insertion hole 31*a* of an anchor member 31 secured to the backing plate 30, and a latch or clasp member 39 is secured to the end of an inner wire 22 (or 27) of each cable 20 (or 25). Thus, each parking brake B is operable to expansively open brake shoes by drawing the inner wire 22 (or 27) with the clasp member 39 being hung on a biforked cable hooking portion 36*a* of the first toggle link 36. Reference numbers 25, 26 and 27 in FIGS. 5 and 6 denote a cable, an outer tube and an inner wire for the other parking brake (not shown).

In each parking brake B, since the clasp member 39 is placed inside the second toggle link 37 taking a narrow U-letter shape in cross-section as viewed from the right or left in FIG. 5, it is impossible by hand to grip and draw the clasp member 39 and to hang the same on the cable hooking portion 36*a* of the first toggle link 36. For this reason, hooking the clasp member 39 on a bottom portion of the cable hooking portion 36*a* is carried out as follows. That is, the clasp member 39 at the end of the inner wire 22 (or 27) is inserted by hand into the cable insertion hole 31*a* with the outer tube 21 (or 26) of the cable 20 (or 25) being gripped, and the inner wire 22 (or 27) is bent as indicated by the two-dot-chain line 39A to be moved along arc-shape guide surfaces 36*c* which are formed at outer edge portions of the biforked cable hooking portion 36*a* of the first toggle link 36. Thus, when the clasp member 39 gets over prominent portions 36*b* formed at outer ends of the cable hooking portion 36*a*, the inner wire 22 (or 27) comes to fall into a groove portion 36*d* (refer to FIG. 6) formed in the biforked cable hooking portion 36*a* owing to its elasticity. A play which is produced between the clasp member 39 and the bottom portion of the cable hooking portion 36*a* is removed by drawing the inner wire 22 (or 27) back inside the outer tube 21 (or 26), whereby the clasp member 39 is seated on the bottom portion of the cable hooking portion 36*a*.

In order to enable the hanging work to do, the protruding amount of each clasp member 39 from the extreme end of the outer tube 21 (or 26) has to be such a length that enables the clasp member 39 to get over the prominent portions 36*b* of the first toggle link 36 in the state that the extreme end of each outer tube 21 (or 26) is held in contact with the bottom portion around the associated cable insertion hole 31*a*, as indicated by the solid line in FIG. 5. On the other hand, in order to downsize the electric parking brake device for lower manufacturing cost, it is necessary to downsize the conversion mechanism and a housing accommodating the same. In this connection, the hanging work is done in the state that the equalizer has been returned by the electric motor to an extreme position toward the parking brake B side and hence that the clasp members 39 at the ends of the inner wires 22, 27 have been protruded from the outer tubes 21, 26 through the largest amounts.

In the foregoing prior art, in order to hang the clasp member 39 of each inner wire 22 (or 27) on the cable hooking portion 36*a* of the first toggle link 36, the outer tube 21 (or 26) of each cable 20 (or 25) is gripped by hand and is drawn to insert the clasp member 39 at the end of the inner wire 22 (or 27) into the cable insertion hole 31*a*. At this time, the clasp member 39 is first brought into contact with the start portions of the guide surfaces 36*c* of the first toggle link 36, and therefore, a reaction force is generated which urges the inner wire 22 (or 27) to be pushed back into the outer tube 21 (or 26). On the other hand, because the equalizer of the electric parking brake device is still pivotable relative to the housing within a certain angular extent even with itself having been returned to the extreme position toward the parking brake B side, the reaction force causes the equalizer to pivot with the result that the inner wire 22 (or 27) is pushed back into the outer tube 21 (or 26) by a distance H1 (not shown) corresponding to the angular extent. Accordingly, the distance between the end portion of each outer tube 21 (or 26) and the root end of each clasp member 39 which distance is required to hang each clasp member 30 on the cable hooking portion 36*a* as mentioned earlier with the end portion of the outer tube 21 (or 26) being in abutting contact with the bottom portion around the cable insertion hole 31*a* becomes the sum of the aforementioned distance H1, a distance H2 (shown in FIG. 5) between the bottom portion of the cable hooking portion 36*a* and the extreme ends of the prominent portions 36*b* and another distance H3 (also shown in FIG. 5) between the end of the outer tube 21 (or 26) and the bottom portion of the cable hooking portion 36*a*.

However, in the foregoing prior art, when the inner wires 22, 27 of the cables 20, 25 are to be drawn for bringing the parking brake B into the braking state, the electric motor is rotated in the positive-going direction, and the conversion mechanism is operated so that the equalizer having been returned to the extreme position through the largest amount toward the parking brake B side is moved in a direction opposite to the parking brake B side. At this time, a loss stroke motion takes place, whereby the parking brake does not work unless the moving distance exceeds the sum of the aforementioned distances H1 and H2. Since the loss stroke motion results in increasing the length of the conversion mechanism, a problem arises in that the large loss stroke movement causes the housing which accommodates the conversion mechanism and the equalizer, to be enlarged in dimension with an increase in the manufacturing cost for the electric parking brake device.

SUMMARY OF THE INVENTION

Accordingly, it is a primary object of the present invention to provide an improved electric parking brake device capable of nulling the aforementioned distance H1 to solve the foregoing problem.

Briefly, according to the present invention, there is provided an electric parking brake device which comprises a housing; an electric motor provided on the housing; an output section movable linearly in the housing; a conversion mechanism provided in the housing for converting reversible rotational motion of the electric motor into reciprocating linear motion of the output section; an equalizer pivotably carried at a center part thereof on the output section; and a pair of cables connecting opposite end portions of the equalizer respectively to parking brakes so that the pair of cables are drawn upon rotation of the electric motor in a first direction to bring the respective parking brakes into a braking state and are returned upon rotation of the electric motor in a second direction to bring the respective parking brakes into a braking release state. The electric parking brake device further comprises stop members for preventing the equalizer from being pivoted in both directions of pivot movement in the state that the equalizer is held returned by the operation of the electric motor to an extreme position on the side of the parking brakes.

With this construction, since the stop members prevent the equalizer from being pivoted in the state that the equalizer is held returned by the operation of the electric motor to the extreme position on the side of the parking brakes, it does not take place that the cables are moved through a loss stroke which is attributed to such pivot movement of the equalizer as mentioned in connection with the foregoing Japanese application No. 2005-16600. Accordingly, the length of the conversion mechanism can be shortened by the length corresponding to the loss stroke, so that the manufacturing cost for the electric parking brake device can be reduced by the downsizing of the housing which accommodates the shortened conversion mechanism and the equalizer therein.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Hereafter, one embodiment according to the present invention will be described with reference to FIGS. 1 to 3. First of all, with reference to FIG. 1, description will be made regarding the overall construction of an electric parking brake device in the embodiment. The electric parking brake device in the present embodiment is composed of a conversion mechanism A for converting reversible rotational motion of an electric motor 13 into reciprocating linear motion of an output element or section (nut) 15, an equalizer 16 pivotably carried at a center part thereof on the output section 15, a housing 10 accommodating the conversion mechanism A and the equalizer 16 therein, and a pair of control cables (recited as cables in the claimed inventions) 20, 25 for connecting the opposite end portions of the equalizer 16 to respective parking brakes B.

Figure 1:
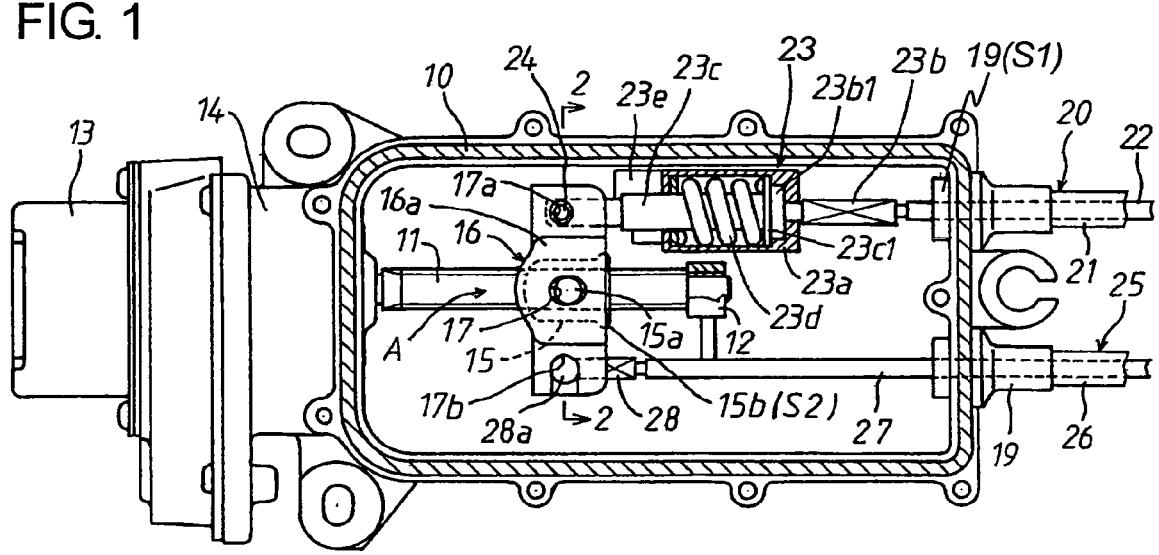
FIG. 1 is a sectional view of the overall construction of an electric parking brake device as viewed from the front side in one embodiment according to the present invention.
Figure 2:
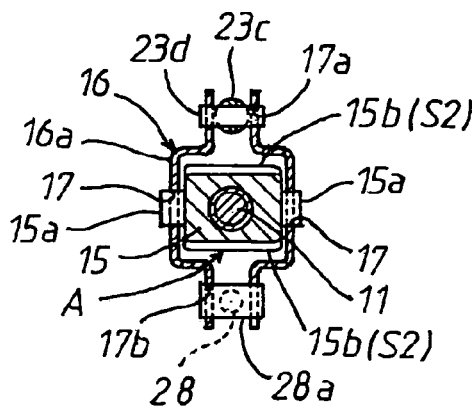
FIG. 2 is a sectional view of the device taken along the line 2-2 in FIG. 1.

As shown in FIGS. 1 and 2, the housing 10 is provided at its one end with the electric motor 13 which drivingly rotates a screw shaft 11 of the conversion mechanism A in either of positive and negative-going directions (recited as first and second directions in the claimed invention) through a one-way clutch 14. The one-way clutch 14 is able to transmit rotation from the electric motor 13 side toward the screw shaft 11 side even when the electric motor 13 is rotated in any of the positive and negative-going directions, but prevent rotation from being transmitted from the screw shaft 11 side toward the electric motor 13 side. The screw shaft 11 has engaged therewith the nut 15 which takes approximately a square shape in cross-section and a rectangular shape as viewed in the axial direction of the screw shaft 11. The extreme end of the screw shaft 11 is rotatably supported by a bearing member 12 secured to a bottom surface of the housing 10.

The equalizer 16 is made by a sheet metal processing to take a U-letter shape as viewed from either side in the lengthwise direction thereof and has a box-like space portion 16a defined at the center part to retain the nut 15 therein. The equalizer 16 is formed at opposite end portions thereof to be narrower than the nut 15 and has a pair of elongate support holes 17 formed in the opposite sides of the box-like space portion 16a. A pair of pivot pins 15a are extended from opposite end surfaces of the nut 15 perpendicularly of the screw shaft 11, and the equalizer 16 is supported at its center part to be pivotable on the nut 15 with the support holes 17 at the box-like space portion 16a being fitted respectively on the pivot pins 15a. At least one side surface (a lower surface as viewed in FIGS. 1 and 3) of the nut 15 normal to the surfaces on which the pivot pins 15 are provided protrudes a protruding portion 15b (recited as a part of nut in the claimed invention) in a direction perpendicular to the screw shaft 11 along the end edge portion thereof on the bearing member 12 side. The equalizer 16 is prevented from being inclined counter-clockwise beyond a predetermined angle relative to a surface normal to the screw shaft 11 when contacted at the inner surface of the box-like space portion 16a thereof with the protruding portion 15b of the nut 15, as shown in FIG. 3. Connection holes 17a, 17b are respectively formed in the opposite end portions of the equalizer 16.

Figure 5:
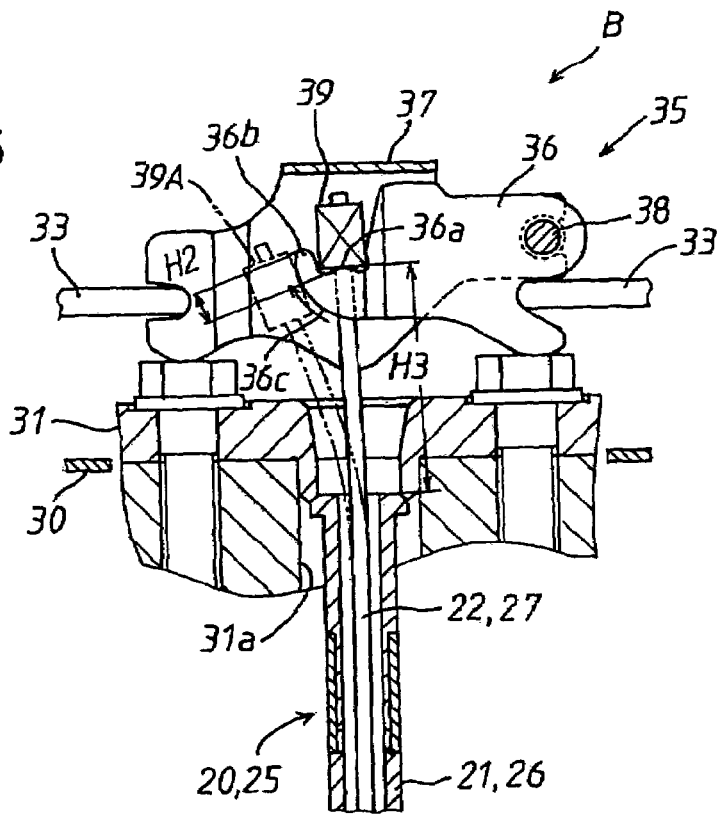
FIG. 5 is a fragmentary sectional view of an example of each parking brake operable by the electric parking brake device according to the present invention, showing a section incorporating a link mechanism connected to a control cable.
Figure 6:
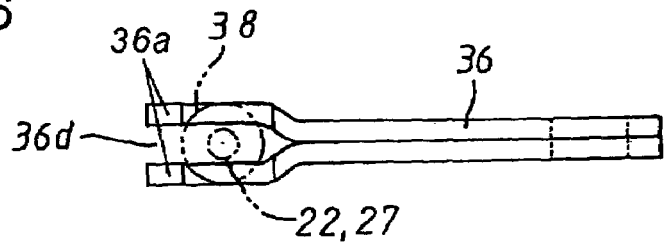
FIG. 6 is a top view of a link shown in FIG. 5.

The pair of control cables 20, 25 are composed of respective outer tubes 21, 26 and inner wires 22, 27 passing therethrough. A pair of outer mounting brackets 19 are attached to an end surface of the housing 10 on the side opposite to the electric motor 13 in parallel to the screw shaft 11. In the assembled state, the pair of control cables 20, 25 pass through the outer mounting brackets 19 at respective one ends thereof to be kept therein. The other end of each control cable 20, 25 is kept in contact with a bottom portion around a cable insertion hole 31a of an anchor member 31 provided in an associated one of the parking brakes B, as typically shown in FIG. 5. Respective one ends of the inner wires 22, 27 are connected by caulking or other suitable means to connection members 23, 28, whose other end portions are pivotably connected to the opposite end portions of the equalizer 16 through connection pins 24, 28a and connection holes 17a, 17b, respectively. Also typically shown in FIG. 5, a latch or clasp member 39 secured to each of respective other ends of the inner wires 22, 27 is hung on a cable hooking portion 36a of a first toggle link 36 in the same manner as described in the foregoing Japanese patent application No. 2001-173692.

In the present embodiment, the connection member 23 connected to one end of the inner wire 22 of one of the control cables 20 is constituted as tension sensor for detecting the tension force acting on the inner wire 22. As shown in FIG. 1, the tension sensor 23 is composed of a cylindrical casing 23a, a wire terminal member 23b protruding outward coaxially from a flange portion 23b1 which is seated on an inner bottom surface formed at one end portion of the casing 23a, a rod 23c slidably inserted into the casing 23a from the other end portion of the same, a compression spring 23d interposed between a flange portion 23c1 formed at the inner end of the rod 23c and the casing 23a for urging the rod 23c toward the inner bottom surface of the casing 23a, and a magnetic sensor 23e for detecting the displacement of the rod 23c. The wire terminal member 23b is larger in diameter than the inner wire 22 and is connected to the inner wire 22 by caulking or other suitable means. Further, the end portion of the rod 23c is connected to one of the opposite end portions of the equalizer 16 by means of the pin 24.

In the tension sensor 23, when the tension force acting between the wire terminal member 23b and the rod 23c is smaller than a predetermined value, the compression spring 23d causes the flange portion 23c1 to remain seated on the inner bottom surface of the casing 23a, so that the distance between the end of the wire terminal member 23b and the connection pin 24 is held to be constant. When the tension force exceeds the predetermined value on the contrary, the compression spring 23d is resiliently deformed to permit the displacement of the rod 23c relative to the casing 23a. Thus, by detecting the displacement by the magnetic sensor 23e, the tension sensor 23 is able to detect whether or not the tension force acting on the inner wire 22 exceeds the predetermined value. The other connection member 28 is a wire terminal member which is larger in diameter than the inner wire 27. The wire terminal member 28 is connected at one end thereof to the inner wire 27 by caulking or other suitable means and at the other end thereof to the other opposite end portion of the equalizer 16 by means of the connection pin 28a.

(Operation)

The operation of the embodiment as constructed above will be described hereinafter. When the electric motor 13 is rotated in the negative-going direction in the state shown in FIG. 1, the screw shaft 11 is rotated through the one-way clutch 14 in the negative-going direction, and the nut 15 and the equalizer 16 pivotably carried thereon are returned toward the side on which the parking brakes B are provided (i.e., toward the right as viewed in FIG. 1 referred to later simply as "parking brake B side"). Thus, in the beginning, the end of the wire terminal member 23b (larger in diameter than the inner wire 22 as mentioned earlier) of the connection member (i.e., tension sensor) 23 is brought into abutting engagement with the inner end of the outer mounting bracket 19 (i.e., first stop member S1) which is attached to the housing 10 to make the inner wire 22 pass therethrough, whereby the connection member 23 and the connection pin 24 are stopped from moving in the axial direction of the screw shaft 11 upon such abutting engagement. When the nut 15 is moved further toward the parking brake B side by the further rotation of the screw shaft 11, the equalizer 16 is turned counterclockwise about the pivot pins 15a, whereby as shown in FIG. 3, the inner surface of the box-like space portion 16a of the equalizer 16 comes to contact with the protruding portion 15b (recited as part of the nut 15 or second stop member S2 in the claimed invention) of the nut 15. Thus, the nut 15 and the equalizer 16 are brought into the state that they are returned to an extreme position (indicated by the solid line in FIG. 3) on the parking brake B side (namely, closest to the end portion of the housing 10 where the outer mounting brackets 19 are provided), simultaneously with which the operation of the electric motor 13 is discontinued to stop the movements of the nut 15 and the equalizer 16.

In this state, the clockwise pivot movement of the equalizer 16 is prevented upon abutting engagement of the wire terminal member 23b of the connection member 23, connected to the connection hole 17a, with the outer mounting bracket 19 (serving as first stop member S1), whereas the counterclockwise pivot movement is prevented upon abutting engagement of the inner surface of the box-like space portion 16a with the protruding portion 15b (serving as second stop member S2) of the nut 15. Further, in this state, the respective clasp members 39 secured to the respective other ends of the inner wires 22, 27 connected to the connection members 23, 28 are protruded through the largest amounts from the respective ends of the associated outer tubes 21, 26, respectively. The respective protruding amounts are set to be such values that enable each of the clasp members 39 to get over the prominent portions 36b of the first toggle link 36 with each associated outer tubes 21 or 26 being held in contact with the bottom portion around the cable insertion hole 31a, as shown typically in FIG. 5.

Further, in this state, in the same manner as described earlier with reference to FIG. 5, each of the outer tubes 21, 26 is gripped by hand to insert the clasp member 39 of the associated inner wire 22 or 27 into the cable insertion hole 31a, and the inner wire 22 or 27 is moved along the guide surfaces 36c of the first toggle link 36 while being resiliently deformed as indicated by the two-dot-chain line 39A in FIG. 5, whereby as soon as the clasp member 39 gets over the prominent portions 36b at the outer side of the cable hooking portion 36a, the inner wire 22 or 27 falls into a groove 36d formed between biforked parts of the cable hooking portion 36a, due to its resilient force. As a result, each clasp member 39 is hung on the cable hooking portion 36a of the first toggle link 36 associated therewith. In this embodiment, because during this hanging manipulation, the equalizer 16 is held not to pivot in both directions as described earlier, it does not takes place that each of the inner wires 22, 27 is pushed back into the associated outer tube 21 or 26 by the reaction force which is generated as a result of each clasp member 39 being brought into the abutting engagement with the start portion of the guide surfaces 36c of the associated first toggle link 36 in the hanging manipulation. Accordingly, of the aforementioned respective distances H1, H2 and H3, the distance H1 by which each of the inner wires 22, 27 is pushed back into the associated outer tube 21 or 26 becomes zero (0).

Then, in the state that each clasp member 39 has been hung on the cable hooking portion 36a of the associated first toggle link 36 after the returning of the nut 15 and the equalizer 16 to the extreme position on the parking brake B side, the screw shaft 11 is rotated by the electric motor 13 in the positive-going direction to move the nut 15 and the equalizer 16 in a direction (i.e., toward the left as viewed in FIG. 1) opposite to the parking brake B side. Thus, in the mid course of this movement, each of the clasp members 39 of the respective inner wires 22, 27 is brought into abutting engagement with the cable hooking portion 36a of the associated first toggle link 36 after it is moved by the distance H2 which separates the end of the prominent portions 36b from the bottom portion of the aforementioned cable hooking portion 36a. In this embodiment, since the distance H1 is zero as mentioned above, the loss stroke being the stroke which exists before the operation start of the parking brakes B is terminated at the position where the abutting engagement takes place. When the screw shaft 11 is rotated in the positive-going direction to move the nut 15 and the equalizer 16 further after the termination of the loss stroke, each first toggle link 36 is immediately pivoted about a connection pin 38 to make the parking brake B start its operation (i.e., application of effective parking brake force). As soon as the tension force of each inner wire 22, 27 detected by the tension sensor 23 (i.e. the magnetic sensor 23e) reaches the aforementioned predetermined value to make the brake forces of the respective parking brakes B increase to a predetermined value, the operation of the electric motor 13 is stopped to discontinue the further operation of the electric parking brake device. Since the action of the equalizer 16 makes the tension forces acting on the respective inner wires 22, 27 be the same as each other, the provision of the tension sensor 23 on one of the inner wires 22 makes it possible to detect the tension force acting on the both inner wires 22, 27 at the same time.

Figure 3:
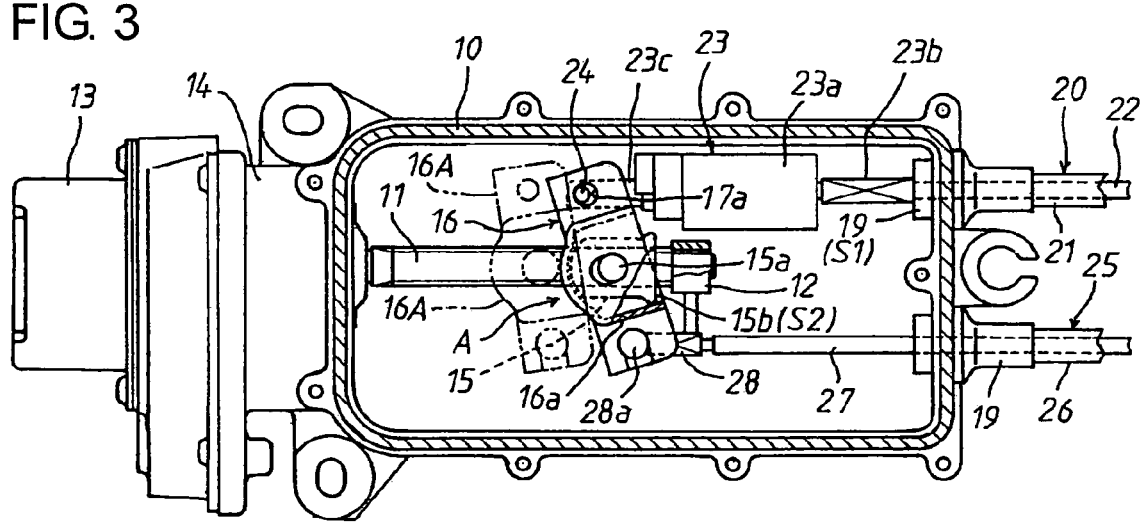
FIG. 3 is the same sectional view as FIG. 1 showing the state that a nut and an equalizer are held returned to an extreme position on the parking brake side.

The two-dot-chain line 16A in FIG. 3 shows the position of the equalizer 16 in this state or the braking state. In the braking state with the equalizer 16 positioned as indicated by the two-dot-chain line in FIG. 3, it does not take place that the parking brakes B are loosened as a result of the nut 15 and the equalizer 16 being returned toward the parking brake B side, because the one-way clutch 14 prevents the screw shaft 11 from being rotated against the electric motor 13 in both directions. For release of the parking brakes B, on the other hand, the screw shaft 11 is rotated by the electric motor 13 in the negative-going direction in the braking state to return the nut 15 and the equalizer 16 toward the parking brake B side. Thus, the parking brakes B are loosened gradually, and the operation of the electric motor 13 is stopped after the complete release of the parking brake operation and right before the very beginning of the aforementioned loss stroke motion. In the ordinary operation, it does not occur that the nut 15 and the equalizer 16 are moved toward the parking brake B side further (i.e., beyond the beginning point of the loss stroke motion).

In the foregoing embodiment, the loss stroke by which the nut 15 and the equalizer 16 are moved from the extreme position on the parking brake B side until the parking brakes B begin to operate is decreased by the amount attributed to the pivot motion of the equalizer 16. Therefore, in comparison with the foregoing prior art, the length of the screw shaft 11 can be shortened by the length corresponding to the decreased amount, so that the manufacturing cost for the electric parking brake device can be reduced by the downsizing of the housing 10 which accommodates the screw shaft 11, the nut 15 and the equalizer 16 therein.

In the foregoing embodiment, the connection member 23 which is connected to one end of the inner wire 22 of one of the control cables 20 is constituted as the tension sensor. With this construction, the operation of the electric motor 13 can be controlled by providing the tension sensor 23 to detect the tension force acting on the respective inner wires 22, 27, and the construction can be simplified by enabling the tension sensor 23 to serve as the connection member, so that the manufacturing cost for the electric parking brake device can be reduced also in this respect. However, the present invention is not limited to using such a construction. For example, the tension sensor 23 may be replaced by a mere connection member that couples the wire terminal member 23b directly with the rod 23c without using the casing 23a and the compression spring 23d. Also in this modified form, the clockwise pivot movement of the equalizer 16 can be prevented in the state that the nut 15 and the equalizer 16 are held returned to the extreme position closest to the parking brake B side (namely, closest to the end portion of the housing 10 where the outer mounting brackets 19 are provided).

Figure 7:
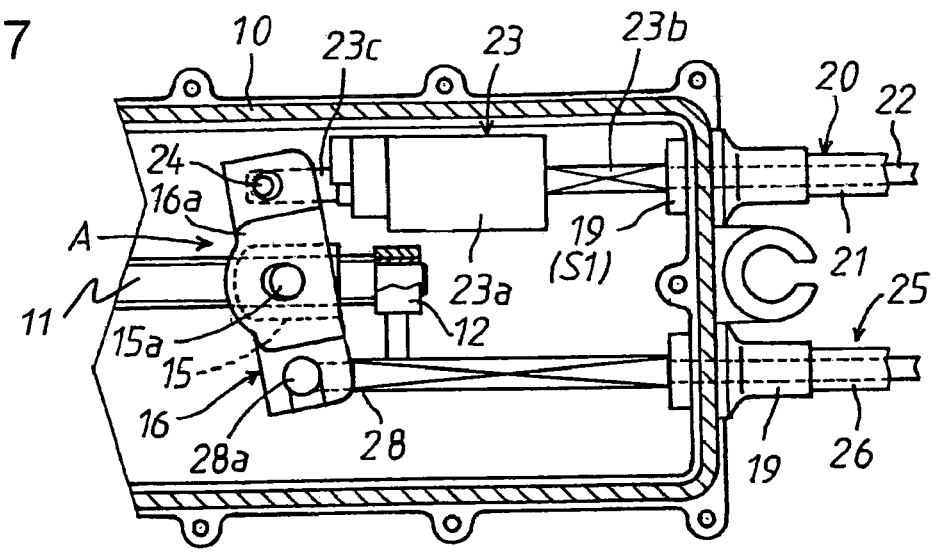
FIG. 7 is a sectional view similar to FIG. 3 showing a modified form of connection members.

Also in the foregoing embodiment, the counterclockwise pivot movement of the equalizer 16 is prevented by bringing the inner surface of the box-like space portion 16a into abutting engagement with the protruding portion 15b (i.e., the second stop member S2) of the nut 15, and with this construction, the second stop member S2 and the nut 15 are integrated into one piece to be simplified in construction, so that the manufacturing cost for the electric parking brake device can be further reduced. However, the present invention is not limited to taking such a construction. For example, in a modified form, the present invention may be implemented by removing the protruding portion 15b, and instead, by elongating the length of the connection member 28 as shown in FIG. 7, whereby the counterclockwise pivot movement of the equalizer 16 can be prevented upon abutting engagement of one end of the elongated connection member 28 with the outer mounting bracket 19 in that state that the nut 15 and the equalizer 16 are held returned to the extreme position closest to the parking brake B side.

Figure 8:
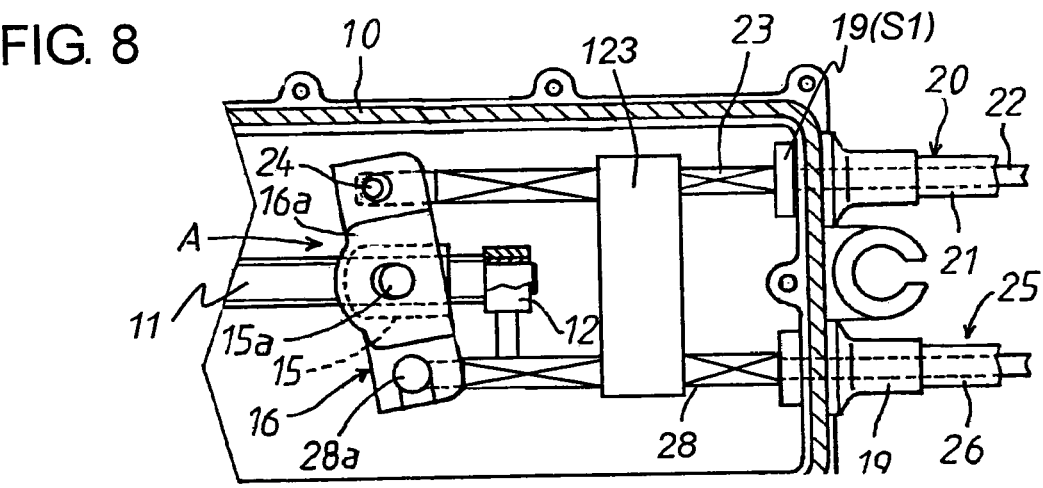
FIG. 8 is a sectional view similar to FIG. 3 showing another modified form of the connection members.

Alternatively, the connection members 23, 28 may be constituted by one taking a single piece of structure in which those portions corresponding to the aforementioned connection members 23, 28 are elongated and formed bodily with a bridge portion 123, as shown in FIG. 8. Thus, the present invention may be implemented so that with the nut 15 and the equalizer 16 being held returned to the extreme position closest to the parking brake B side, the clockwise pivot movement of the equalizer 16 is stopped upon abutting engagement of one end of the connection member portion 23 with the outer mounting bracket 19 whereas the counterclockwise pivot movement of the equalizer 16 is stopped upon abutting engagement of one end of the connection member portion 28 with the mounting outer bracket 19, which serves as the second stop member S2 in the modified form.

Figure 4:
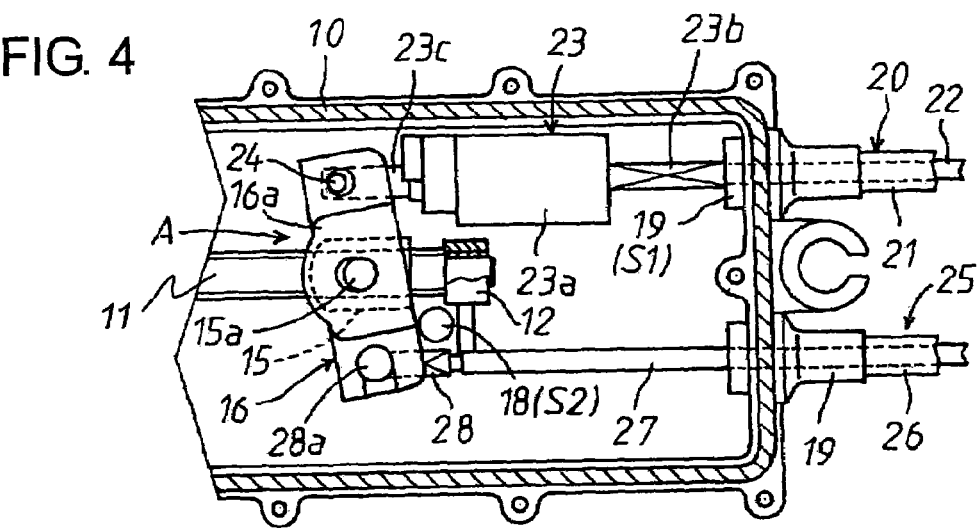
FIG. 4 is a fragmentary sectional view of the device incorporating a modified form of a second stop member.

FIG. 4 shows another modified form of the second stop member S2 in the embodiment shown in FIGS. 1 through 3. In this modified form, the protruding portions 15b are removed from the nut 15, instead of which an abutting member 18 (serving as the second stop member S2) is provided upstanding from a bottom surface of the housing 10 at a position which is adjacent to the bearing member 12 and opposite to the tension sensor 23 with respect to the screw shaft 11. With the nut 15 and the equalizer 16 being held returned to the extreme position closest to the parking brake B side, the abutting member 18 is brought into contact with an end surface of the equalizer 16 to prevent the counterclockwise pivot movement of the same. With this construction, since the housing 10 has secured thereto the abutting member 18 which is brought into contact with the equalizer 16 to stop the counterclockwise pivot movement of the same, it can be realized to obtain a stop member which is simple in construction and satisfactory in strength. Other constructions of this modification are the same as those of the foregoing embodiment shown in FIGS. 1 through 3, and therefore, the detailed description therefor can be omitted for the sake of brevity.

In the foregoing embodiment, description has been made by exemplifying as controlled objects the parking brakes B of the type that each clasp member 39 at the end of the inner wire 22 or 27 is inserted into the cable insertion hole 31a of the anchor member 31 to be hung on the associated first toggle link 36, and the parking brakes B of this type are suitable to be used together with the electric parking brake device according to the present invention. However, the present invention is not limited to be used together with the parking brakes B of the aforementioned type. Rather, it is possible to implement the present invention together with parking brakes of any other type.

Figure 9:
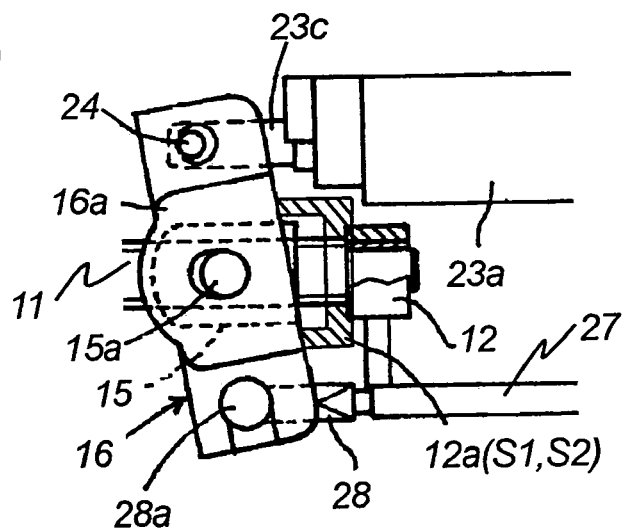
FIG. 9 is an enlarged fragmentary view partly in section showing another modified form of stop members.

In addition, as shown in FIG. 9, the present invention may be implemented in such a form that the bearing member 12 is provided with a flange portion 12a (serving as a bidirectional stop member) on the equalizer 16 side and that with the nut 15 and the equalizer 16 being held returned to the extreme position closest to the parking brake B side, the flange portion 12a comes to contact with an end surface around the center part of the equalizer 16 to prevent the same from pivoting in both directions. With this construction, the flange portion 12a for preventing the equalizer 16 from pivoting in both directions upon contact with the same is integrated or made as one piece with the bearing member 12 and is simplified in construction, so that the manufacturing cost for the electric parking brake device can be further reduced.

Finally, various features and many of the attendant advantages in the foregoing embodiment will be summarized as follows:

In the foregoing embodiment typically shown in FIG. 3, since the stop members S1, S2 stop the equalizer 16 from being pivoted in the state that the equalizer 16 is held returned by the operation of the electric motor 13 to the extreme position closest to the side of the parking brakes B, it does not take place that the cables 20, 25 are moved through the aforementioned loss stroke which is attributed to such pivot movement of the equalizer 16 as mentioned in connection with the foregoing Japanese application No. 2005-16600. Accordingly, the length of the conversion mechanism A can be shortened by the length corresponding to the loss stroke, so that the manufacturing cost for the electric parking brake device can be reduced by the downsizing of the housing 10 which accommodates the conversion mechanism A and the equalizer 16 therein.

Also in the foregoing embodiment typically shown in FIG. 3, the pivot movement of the equalizer 16 is prevented by the first and second stop members S1, S2, the same effect as mentioned just before can be attained.

Also in the foregoing embodiment typically shown in FIG. 3, since one end of the connection member 23 connecting one end portion of the equalizer 16 to one end of the inner wire 22 of the cable 20 is utilized as a member which is brought into abutting engagement with the stop member S1, the construction can be simplified, so that the manufacturing cost for the electric parking brake device can be further reduced.

Also in the foregoing embodiment typically shown in FIG. 1, since the construction is simplified by constituting the connection member by the tension sensor 23 for detecting the tension force acting on the inner wires 22, 27, it can be realized to reduce the manufacturing cost for the electric parking brake device incorporating the tension sensor 23 therein.

Also in the foregoing embodiment typically shown in FIG. 3, since the construction is simplified by providing the nut 15 with the stop portions 15b bodily, it can be realized to further reduce the manufacturing cost for the electric parking brake device.

In one of the foregoing modified forms of the embodiment typically shown in FIG. 4, since the abutting member 18 for stopping the pivot movement of the equalizer 16 upon contact with the same is secured to the housing 10, it can be realized to make the stop member 18 simple in construction and satisfactory in strength.

In the foregoing another modified form of the embodiment typically shown in FIG. 9, since the stop member 12a of one piece structure is used to prevent the pivot movements of the equalizer 16 in both directions, it can be realized to further reduce the manufacturing cost for the electric parking brake device. In particular, since the stop member 12a of one piece structure is bodily formed on the bearing member 12, it can be realized to further reduce the manufacturing cost for the electric parking brake device.

Obviously, numerous further modifications and variations of the present invention are possible in light of the above teachings. It is therefore to be understood that within the scope of the appended claims, the present invention may be practiced otherwise than as specifically described herein.

What is claimed is:

1. An electric parking brake device for operating two parking brakes of a vehicle, the electric parking brake device comprising:

a housing;

an electric motor provided on the housing;

an output section movable linearly in the housing;

a conversion mechanism provided in the housing for converting reversible rotational motion of the electric motor into reciprocating linear motion of the output section;

an equalizer pivotably carried at a center part thereof on the output section;

a pair of cables connecting opposite end portions of the equalizer respectively to the parking brakes so that the pair of cables are drawn upon rotation of the electric motor in a first direction to bring the respective parking brakes into a braking state and are returned upon rotation of the electric motor in a second direction to bring the respective parking brakes into a braking release state; and stop members contactable with the equalizer for preventing the equalizer from being pivoted in any direction of pivot movement in the state that the equalizer is held returned by the operation of the electric motor to an extreme position, prior to manually connecting the pair of cables to the parking brakes, which is closest to the side of the parking brakes and which is outside a moving stroke of the equalizer during parking brake operation, wherein the stop members comprise a first stop member contactable with the equalizer for preventing the equalizer from being pivoted in one direction of pivot movement in the state that the equalizer is held returned by the operation of the electric motor to the extreme position, and a second stop member for preventing the equalizer from being pivoted in an opposite direction of pivot movement in the state that the equalizer is held returned by the operation of the electric motor to the extreme position, and wherein the conversion mechanism comprises a screw shaft rotatable by the electric motor and a nut screw-engaged with the screw shaft and pivotably carrying the equalizer, and at least one of the first and second stop members comprises a portion of a bearing member rotatably supporting the screw shaft.

2. The electric parking brake device as set forth in claim 1, further comprising:

inner wires respectively passing through the cables; and a connection member connecting one end portion of the equalizer to one end of one of the inner wires;

wherein at least one of the first and second stop members comprises a member attached to the housing.

3. The electric parking brake device as set forth in claim 2, wherein the connection member comprises a tension sensor for detecting the tension force acting on the inner wire connected to the connection member.

4. The electric parking brake device as set forth in claim 1, wherein at least one of the first and second stop members comprises a member secured to the housing for preventing the equalizer from being pivoted upon contact of the equalizer with the member secured to the housing in the state that the equalizer is held returned by the operation of the electric motor to the extreme position.

5. The electric parking brake device as set forth in claim 1, wherein the stop members are constituted by a one piece member for preventing the equalizer from being pivoted in both directions of pivot movement in the state that the equalizer is held returned by the operation of the electric motor to the extreme position.

6. The electric parking brake device as set forth in claim 1, further comprising:

inner wires respectively passing through the cables; and a pair of connection members connecting opposite end portions of the equalizer to respective ends of the inner wires.

7. An electric parking brake device for operating two parking brakes of a vehicle, the electric parking brake device comprising:

a housing;

an electric motor provided on the housing;

an output section movable linearly in the housing;

a conversion mechanism provided in the housing for converting reversible rotational motion of the electric motor into reciprocating linear motion of the output section;

an equalizer pivotably carried at a center part thereof on the output section;

a pair of cables connecting opposite end portions of the equalizer respectively to the parking brakes so that the pair of cables are drawn upon rotation of the electric motor in a first direction to bring the respective parking brakes into a braking state and are returned upon rotation of the electric motor in a second direction to bring the respective parking brakes into a braking release state; and stop members contactable with the equalizer for preventing the equalizer from being pivoted in any direction of pivot movement in the state that the equalizer is held returned by the operation of the electric motor to an extreme position, prior to manually connecting the pair of cables to the parking brakes, which is closest to the side of the parking brakes and which is outside a moving stroke of the equalizer during parking brake operation, wherein the stop members are constituted by a one piece member for preventing the equalizer from being pivoted in both directions of pivot movement in the state that the equalizer is held returned by the operation of the electric motor to the extreme position, the conversion mechanism comprises a screw shaft rotatable by the electric motor and a nut screw-engaged with the screw shaft and pivotably carrying the equalizer, and the one piece member comprises a bearing member secured to the housing and rotatably supports an end portion of the screw shaft, for preventing the equalizer from being pivoted in any direction of pivot movement upon contact with a center part of the equalizer in the state that the equalizer is held returned by the operation of the electric motor to the extreme position.

8. An electric parking brake device for operating two parking brakes of a vehicle, the electric parking brake device comprising:

a housing;

an electric motor provided on the housing;

an output section movable linearly in the housing;

a conversion mechanism provided in the housing for converting reversible rotational motion of the electric motor into reciprocating linear motion of the output section;

an equalizer pivotably carried at a center part thereof on the output section;

a pair of cables connecting opposite end portions of the equalizer respectively to the parking brakes so that the pair of cables are drawn upon rotation of the electric motor in a first direction to bring the respective parking brakes into a braking state and are returned upon rotation of the electric motor in a second direction to bring the respective parking brakes into a braking release state; and stop members contactable with the equalizer for preventing the equalizer from being pivoted in any direction of pivot movement in the state that the equalizer is held returned by the operation of the electric motor to an extreme position, prior to manually connecting the pair of cables to the parking brakes, which is closest to the side of the parking brakes and which is outside a moving stroke of the equalizer during parking brake operation, wherein the stop members are constituted by a one piece member for preventing the equalizer from being pivoted in both directions of pivot movement in the state that the equalizer is held returned by the operation of the electric motor to the extreme position, the conversion mechanism comprises a screw shaft rotatable by the electric motor and a nut screw-engaged with the screw shaft and pivotably carrying the equalizer, and the one piece member comprises a flange portion of a bearing member, the bearing member being secured to the housing and rotatably supporting an end portion of the screw shaft.

* * * * *